(12) United States Patent
Nozaki et al.

(10) Patent No.: US 7,882,912 B2
(45) Date of Patent: Feb. 8, 2011

(54) INTAKE STRUCTURE FOR SEAT TYPE VEHICLE

(75) Inventors: Naoki Nozaki, Saitama (JP); Takeshi Kobayashi, Saitama (JP); Masahiro Inoue, Saitama (JP); Katsumi Kanai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 552 days.

(21) Appl. No.: 11/727,788

(22) Filed: Mar. 28, 2007

(65) Prior Publication Data

US 2007/0227793 A1 Oct. 4, 2007

(30) Foreign Application Priority Data

Mar. 31, 2006 (JP) ............................. 2006-096581

(51) Int. Cl.
*B60K 13/02* (2006.01)
(52) U.S. Cl. ..................................... 180/68.3; 180/291
(58) Field of Classification Search ................ 180/68.1, 180/68.2, 68.3, 291, 233, 251
See application file for complete search history.

(56) References Cited

U.S. PATENT DOCUMENTS

| | | | | | |
|---|---|---|---|---|---|
| 4,117,927 | A | * | 10/1978 | Gothsche | 206/319 |
| 4,696,361 | A | * | 9/1987 | Clark et al. | 180/68.4 |
| 4,817,985 | A | * | 4/1989 | Enokimoto et al. | 280/788 |
| 4,909,530 | A | * | 3/1990 | Tsukada et al. | 180/296 |
| 4,924,959 | A | * | 5/1990 | Handa et al. | 180/297 |
| 5,086,858 | A | * | 2/1992 | Mizuta et al. | 180/68.3 |
| 5,327,989 | A | * | 7/1994 | Furuhashi et al. | 180/248 |
| 6,086,492 | A | * | 7/2000 | Nakano et al. | 474/16 |
| 6,269,899 | B1 | * | 8/2001 | Izumi | 180/233 |
| 6,394,555 | B2 | * | 5/2002 | Mizuta et al. | 298/38 |
| 6,494,285 | B1 | * | 12/2002 | Williams | 180/291 |
| 6,823,956 | B2 | * | 11/2004 | Shimizu | 180/68.1 |
| 7,073,850 | B2 | * | 7/2006 | Erney et al. | 296/203.04 |
| 7,147,076 | B2 | * | 12/2006 | Izumi | 180/250 |
| 7,168,516 | B2 | * | 1/2007 | Nozaki et al. | 180/68.3 |
| 7,290,533 | B2 | * | 11/2007 | Tsuruta et al. | 123/509 |
| 7,357,211 | B2 | * | 4/2008 | Inui | 180/266 |
| 7,363,999 | B2 | * | 4/2008 | Hastings | 180/220 |
| 7,506,712 | B2 | * | 3/2009 | Kato et al. | 180/68.3 |
| 2001/0045314 | A1 | * | 11/2001 | Maki et al. | 180/309 |
| 2001/0054832 | A1 | * | 12/2001 | Mizuta | 296/205 |
| 2004/0195019 | A1 | * | 10/2004 | Kato et al. | 180/68.3 |
| 2006/0071003 | A1 | * | 4/2006 | Miyauchi et al. | 220/361 |

* cited by examiner

FOREIGN PATENT DOCUMENTS

JP 7-7267 Y2 2/1995

OTHER PUBLICATIONS

Kubota RTV900 photos from Kubota.com, verified on web.archive.org dated on or before Sep. 24, 2005.*

*Primary Examiner*—J. Allen Shriver, II
*Assistant Examiner*—Vaughn T Coolman
(74) *Attorney, Agent, or Firm*—Birch, Stewart, Kolasch & Birch, LLP

(57) ABSTRACT

To provide an intake structure for a seat type vehicle which makes it possible to shorten the air intake path and to prevent the taken-in air from being heated with the heat of an engine. An intake structure for a seat type vehicle is provided in which an engine and a fuel tank are mounted side by side in the lateral direction of the vehicle under the occupant seats attached onto a frame. An air cleaner is arranged to the rear of the engine with an intake port for the air cleaner being provided under the occupant seats and above the fuel tank.

20 Claims, 9 Drawing Sheets

INTAKE STRUCTURE FOR SEAT TYPE VEHICLE

CROSS-REFERENCE TO RELATED APPLICATIONS

The present application claims priority under 35 USC 119 to Japanese Patent Application No. 2006-096581 filed on Mar. 31, 2006 the entire contents of which are hereby incorporated by reference.

BACKGROUND OF THE INVENTION

1. Field of the Invention

The present invention relates to an intake structure for a seat type vehicle for sucking the air to be taken into an engine.

2. Description of Background Art

A MUV (Multi Utility Vehicle) vehicle is commonly known as a seat type vehicle capable of driving over rough terrain or the like. In the vehicle of this type, an engine and an air cleaner are mounted below a driver's seat, and a hollow frame (roll bar) that extends in the vertical direction of the vehicle is provided so as to surround the driver's seat. The air to be supplied to this engine is taken in from an intake port provided in an upper portion of the hollow frame. The air thus taken in passes through the hollow of the hollow frame (snorkel) to be sent to the air cleaner wherein dust is removed by the air cleaner and then the air is sent to the engine. See, for example, JP-U No. H4-43577.

However, the construction in which the intake port is provided in an upper portion of the hollow frame leads to an increased length of the air intake path. Thus, this construction is not necessarily desirable from the viewpoint of intake efficiency. On the other hand, in the case of a construction in which the air intake path is shortened without using the hollow frame, it is necessary to provide the intake port in the vehicle body portion. In this case, it is preferable that the air taken in from the intake port should not be heated with the heat of the engine.

SUMMARY AND OBJECTS OF THE INVENTION

The present invention has been made in view of the above-mentioned circumstances. It is an object of an embodiment of the present invention to provide an intake structure for a seat type vehicle which makes it possible to shorten the air intake path and to prevent the taken-in air from being heated with the heat of the engine.

According to the present invention, there is provided an intake structure for a seat type vehicle, wherein an engine and a fuel tank are mounted side by side in a lateral direction of the vehicle under an occupant seat attached onto a frame with an air cleaner is arranged to the rear of the engine. An intake port for the air cleaner is provided under the occupant seat and above the fuel tank.

According to this construction, since the intake port is located below the occupant seat, the air intake path can be shortened. Further, the intake port is provided at a position remote from the engine, thereby making it possible to prevent the air that is taken-in from being heated with the heat of the engine.

Further, an intake pipe connecting between the air cleaner and the intake port may be arranged above the fuel tank so as to avoid an interference with the engine.

According to this construction, it is possible to prevent the air passing through the intake pipe from being heated with the heat of the engine.

Further, a partition wall may be provided between the engine and the fuel tank.

According to this construction, the partition wall serves to prevent the convection of heat, thereby making it possible to prevent the taken-in air from being heated and also prevent the air passing through the intake pipe from being heated.

According to an embodiment of the present invention, by providing the intake port above the fuel tank, the air intake path can be shortened, and the intake efficiency can be enhanced as compared with the structure of the related art. Further, the thermal efficiency of the engine can be enhanced by preventing the taken-in air from being heated with the heat of the engine. Further, by arranging the intake port above the fuel tank, it is possible to enhance the thermal efficiency of the engine by preventing the air passing through the intake pipe from being heated with the heat of the engine. Furthermore, the provision of the partition wall makes it possible to prevent the taken-in air from being heated due to the convection of heat flowing from the engine side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An intake structure for a seat type vehicle according to an embodiment of the present invention will now be described with reference to the drawings.

It should be noted that in this embodiment, a MUV (Multi Utility Vehicle) will be described as an example of the seat type vehicle. Further, in the following description, as for the up, down, front, and rear directions, the front side refers to the left-hand side as seen in FIG. 1, and the left and right directions refer to the directions as seen from the driver when seated in the occupant seat.

Figure 1:
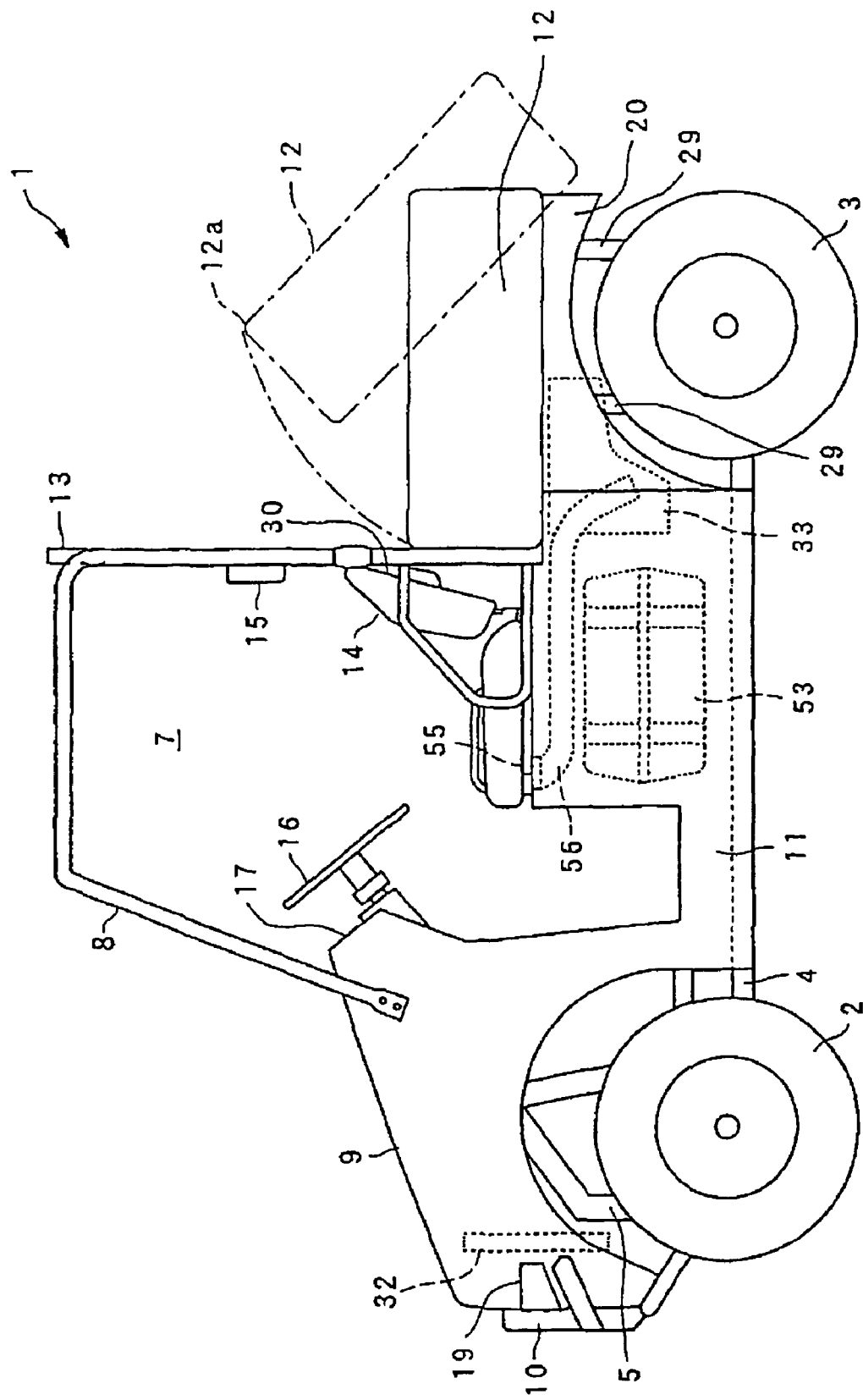
FIG. 1 is a side view of a vehicle equipped with an intake structure for a seat type vehicle according to an embodiment of the present invention.

As shown in FIG. 1, a MUV vehicle 1 is a four-wheel vehicle capable of driving over rough terrain or the like and having two front wheels 2 and two rear wheels 3 provided on the front and rear sides, respectively.

Figure 2:
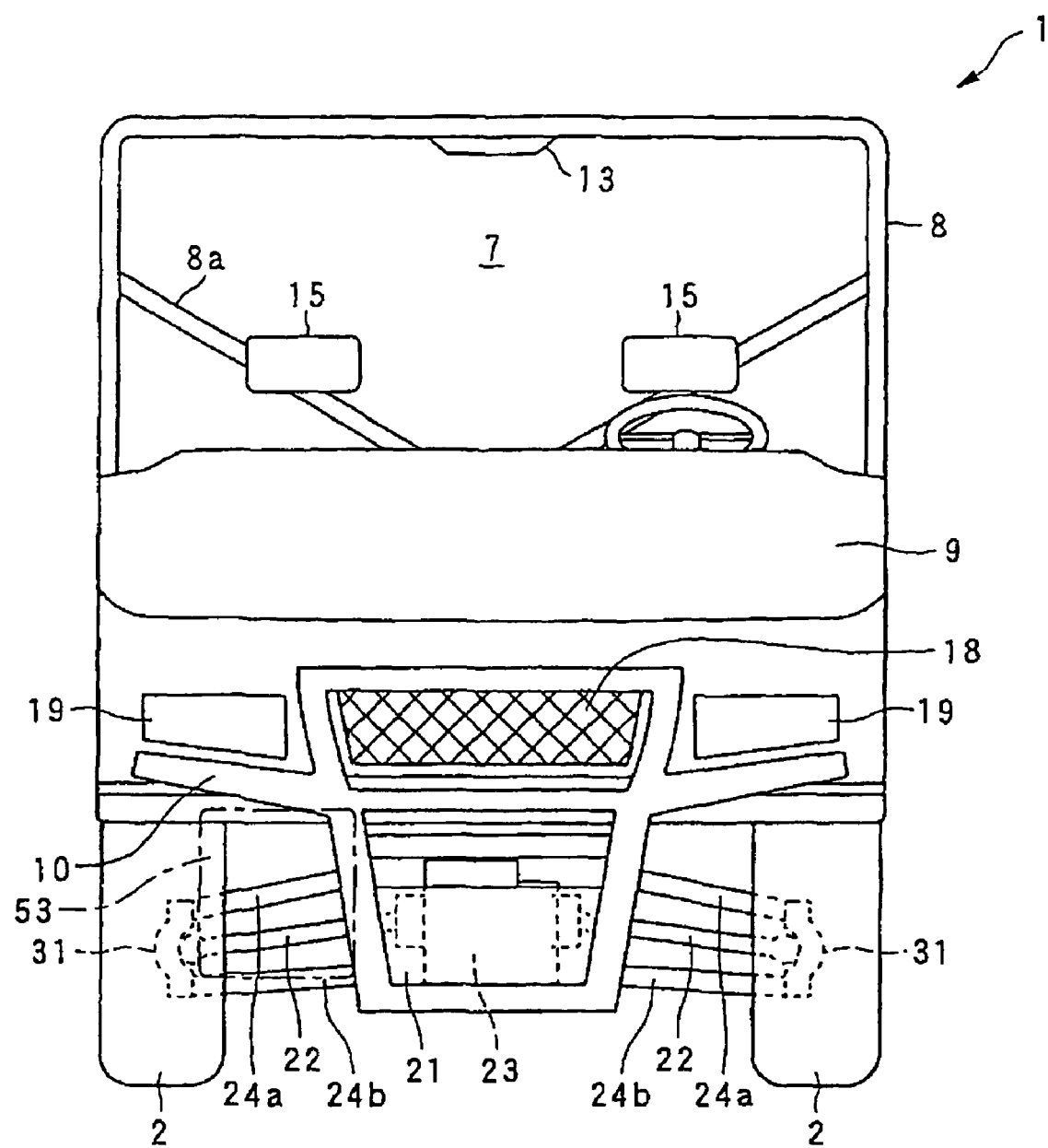
FIG. 2 is a front view of the vehicle shown in FIG. 1

As shown in FIGS. 1 and 2, at the front portion of the vehicle 1, there are provided a bonnet 9 attached by means of a hinge or the like so as to freely open and close in the vertical direction, a front grille 18 for taking in air during the operation of the vehicle, a headlight 19 arranged on either side of the front grille 18, and a carrying pipe 10 for protecting the front-side portion of the vehicle.

As shown in FIG. 2, as seen from the front side of the vehicle, the carrying pipe 10 is formed substantially in the shape of the number 8, and extends laterally from either side of the 8-shaped configuration to the portion below the headlight 19. The front grille 18 is exposed on the front surface of the vehicle through the opening in the upper side of the 8-shaped configuration of the carrying pipe 10. As shown in FIG. 1, arranged on the back side of the front grille 18 is a radiator 37 for cooling the cooling water with an air flow from the front grille 18.

Further, a skid plate 21 is provided in the opening in the lower side of the 8-shaped configuration so as to occupy the lower half of this opening. A front-wheel final reduction gear 23 is arranged on the back side of the skid plate 21. A drive shaft 22 for driving the front wheels 2 is coupled to the final reduction gear 23. Further, upper and lower suspension arms 24a, 24b are coupled to each of the front wheels 2 via a knuckle 31. The proximal end portions of the suspension arms 24a, 24b are attached to front frames 5 that will be described later in detail.

Figure 4:
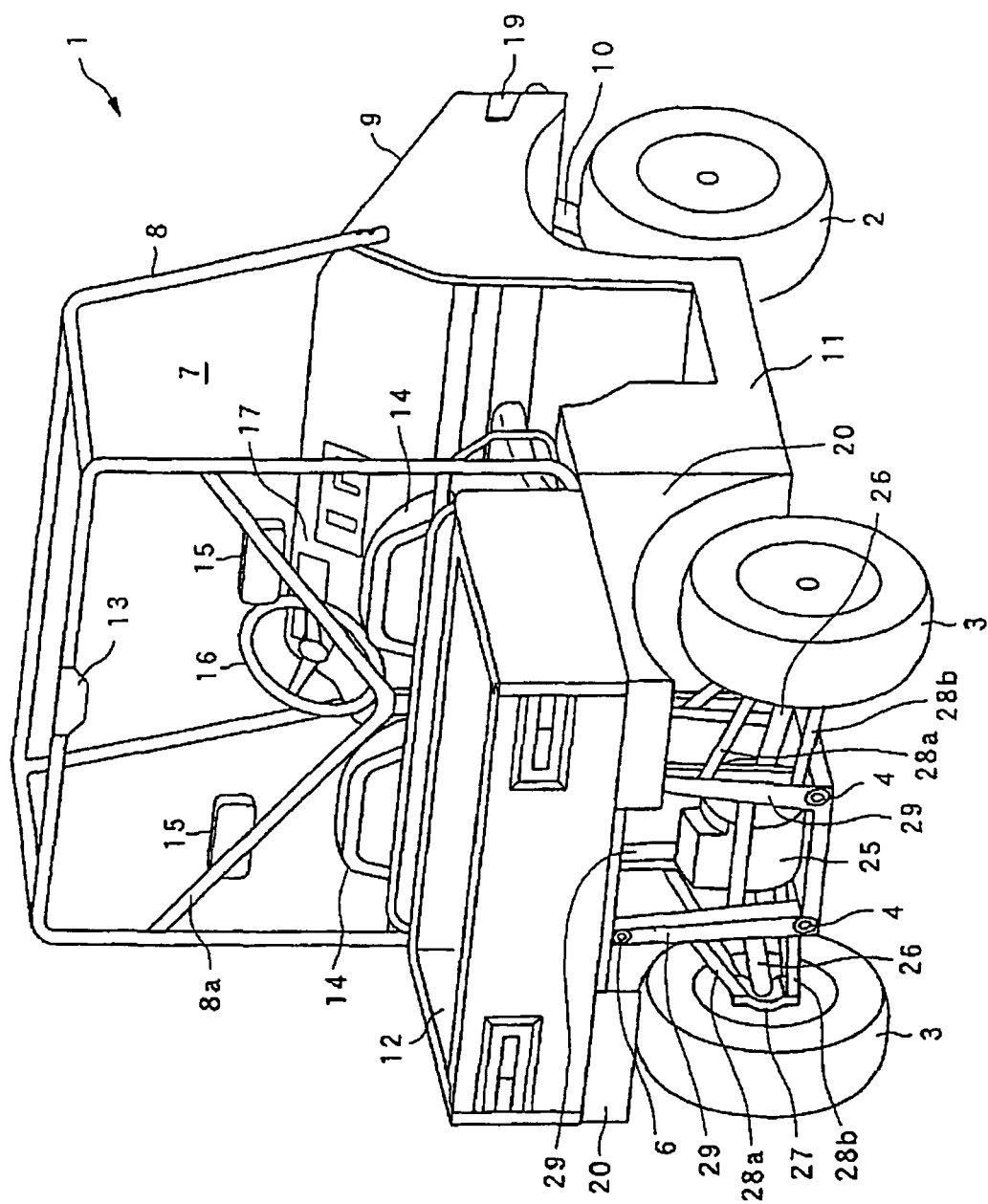
FIG. 4 is a perspective view, as seen diagonally from the right rear, of the vehicle shown in FIG. 1.

As shown in FIGS. 1 and 4, on either side portion of the vehicle 1, there are provided a body cover 11 that covers the side surface portion of the vehicle, and a fender 20 located on the vehicle rear side with respect to the vehicle cover 11. Further, the vehicle 1 is not provided with a door or the like, and a cab 7 located above the body cover 11 is only surrounded by a roll bar 8 assembled using a frame member.

Figure 3:
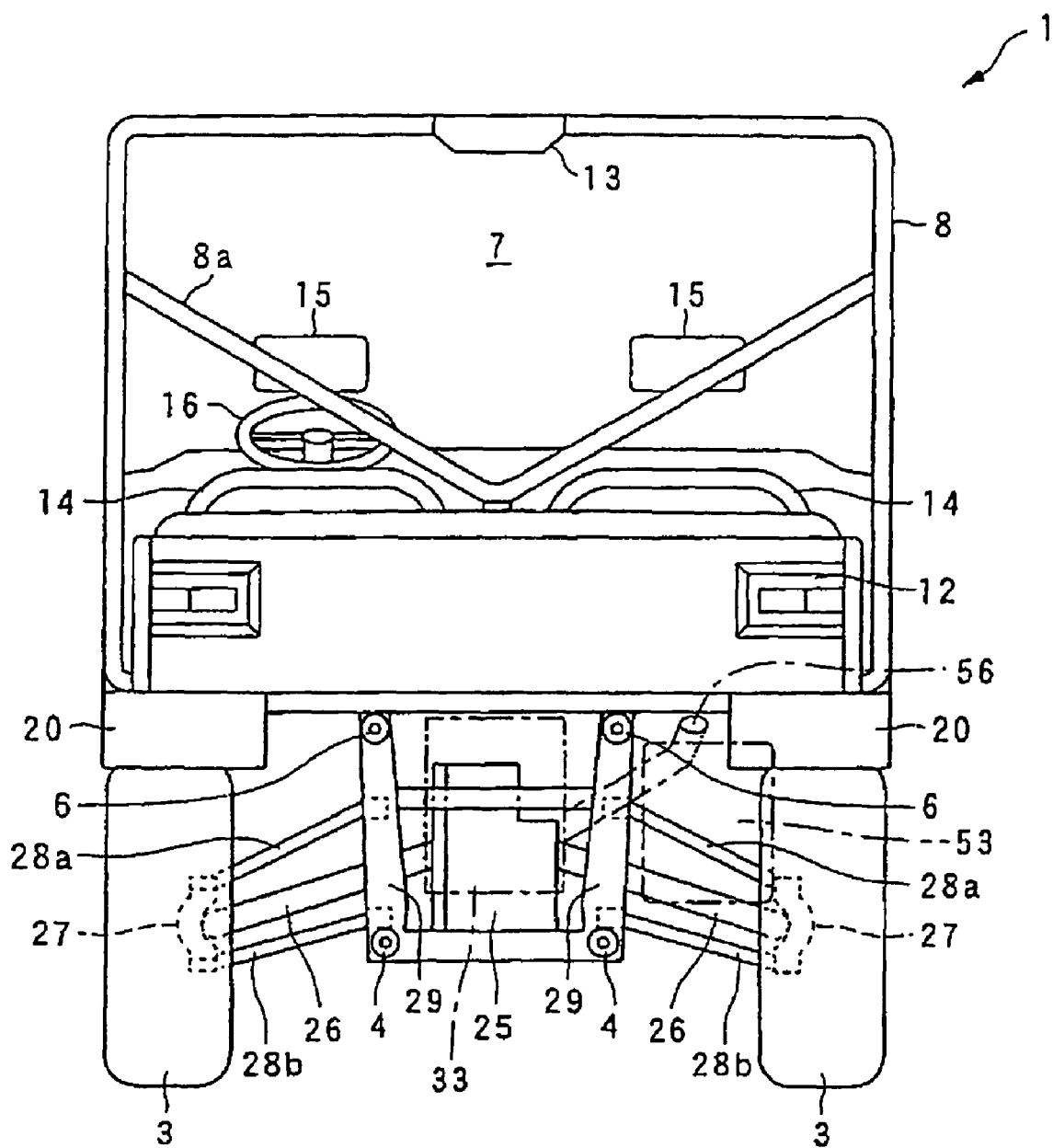
FIG. 3 is a rear view of the vehicle shown in FIG. 1.

As shown in FIGS. 1, 3, and 4, a load-carrying platform 12 for loading cargo is provided in the rear portion of the vehicle 1. The load-carrying platform 12 includes a rotary shaft (not shown) provided at a lower rear end portion. The front side portion of the load-carrying platform 12 can be lifted upward about this rotary shaft (see the load-carrying platform 12 indicated by the two-dot chain line in FIG. 1).

Further, in the rear portion of the vehicle 1, a rear-wheel final reduction gear 25 is arranged in the portion surrounded by lower frames 4 and upper frames 6 that will be described later in detail. A drive shaft 26 for driving the rear wheels 3 is coupled to the final reduction gear 25. Further, upper and lower suspension arms 28a, 28b are coupled to each of the rear wheels 3 via a knuckle 27. The proximal end portions of the suspension arms 28a, 28b are coupled to U-shaped brackets 29 vertically connecting between the lower frames 4 and the upper frames 6.

A stop lamp 13 that illuminates upon the actuation of the brake is mounted in an upper rear portion of the roll bar 8. The stop lamp 13 is positioned such that the mounting height of the stop lamp 13 is higher than the height of an upper end portion 12a of the load-carrying platform 12 at the time when the front side of the load-carrying platform 12 is lifted up. That is, the stop lamp 13 is placed at a position where it can be viewed from the rear of the vehicle 1 irrespective of the tilting state of the load-carrying platform 12.

The cab 7 is provided with two occupant seats 14 (which may be a bench seat as well) respectively arranged on the driver's seat side and on the passenger seat side with two headrests 15 arranged at positions above the occupant seats 14. A steering wheel 16 is positioned in front of the driver's seat. An instrument panel 17 is located further frontward with respect to the steering wheel 16 for covering the front surface portion while extending rearwardly towards the driver's seat and the passenger seat. The occupant seats 14 are fixed to a seat frame 30 mounted above the upper frames 6 which will be described later. Further, the headrests 15 are mounted onto a reinforcing frame 8a extending in a substantially V-shaped configuration (see FIG. 3) from the roll bar 8.

Figure 5:
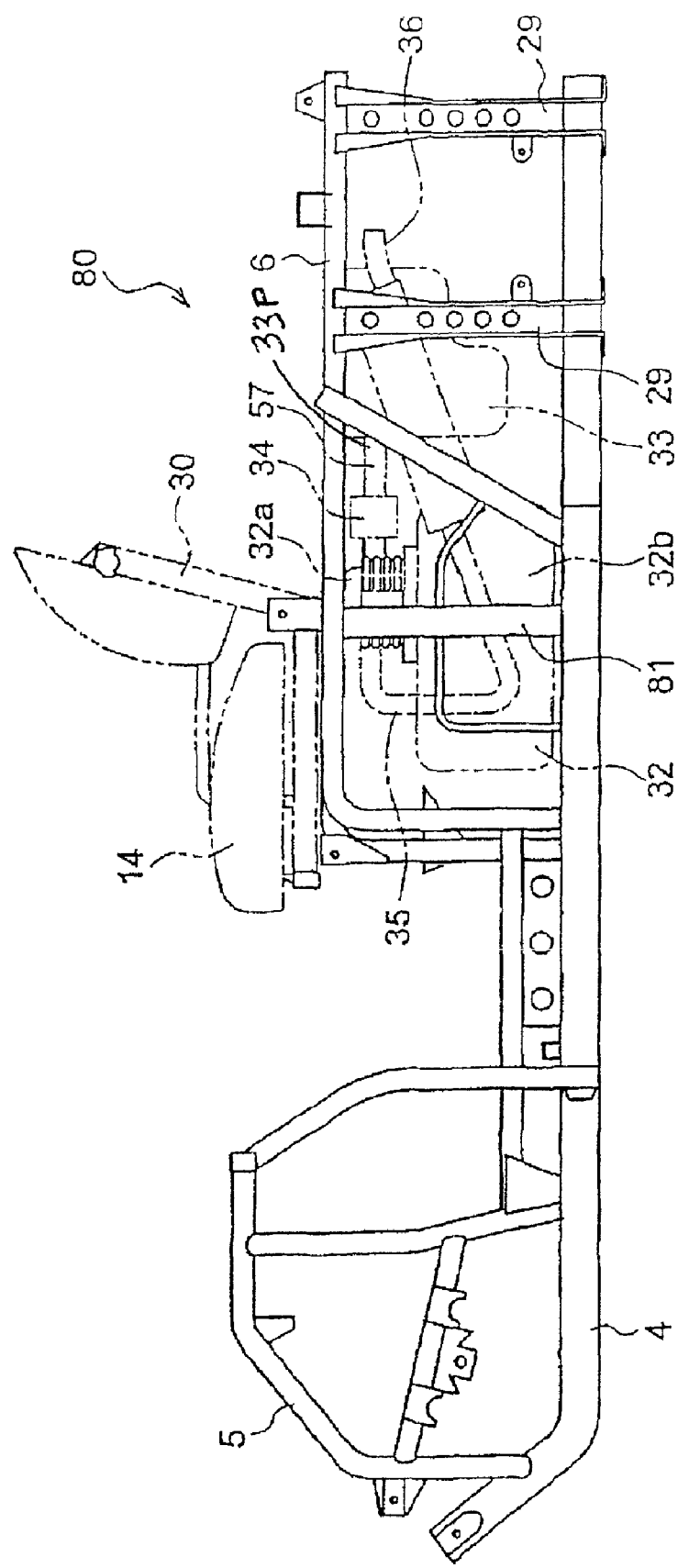
FIG. 5 is a side view showing the body frame structure of the vehicle shown in FIG. 1.
Figure 6:
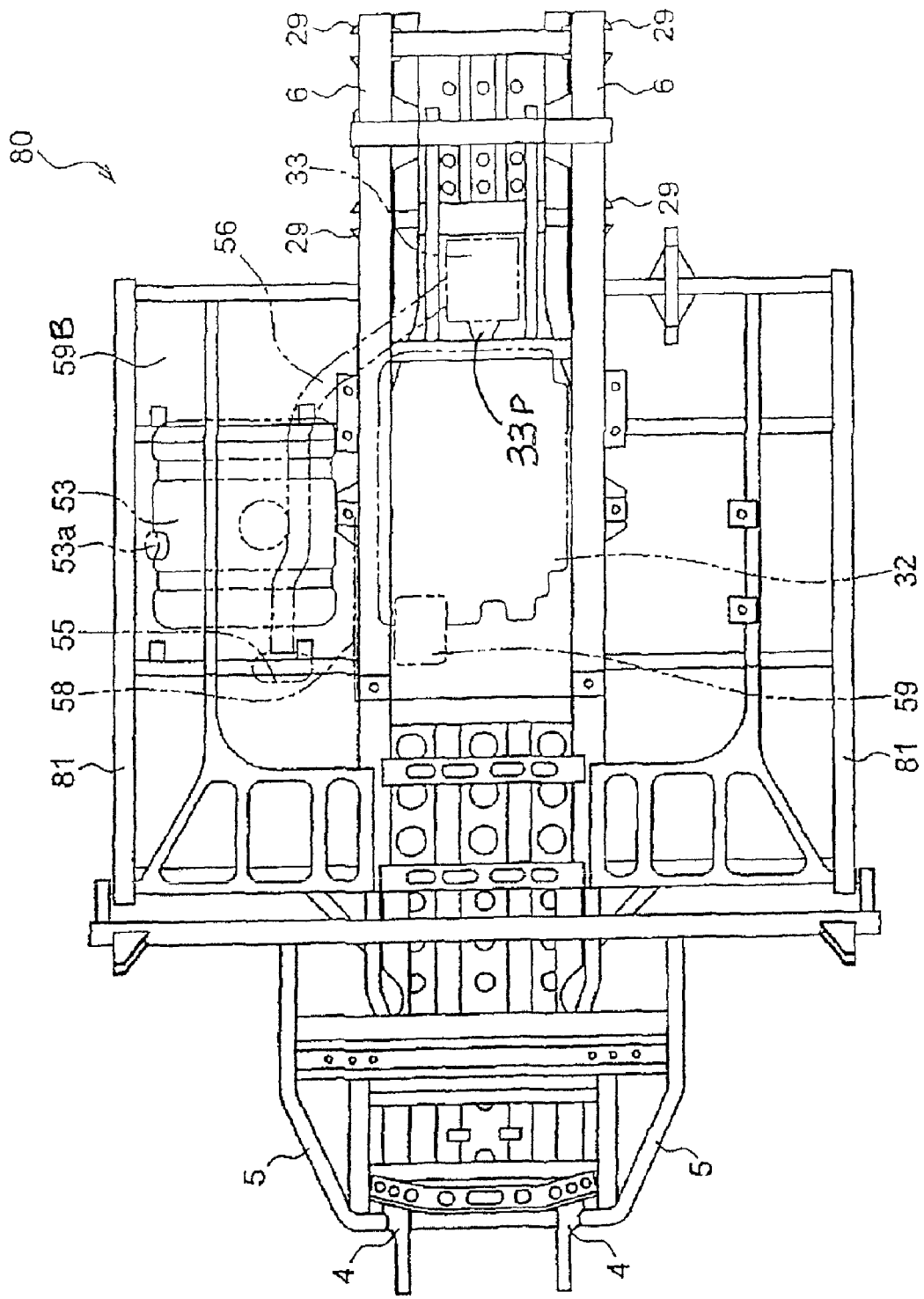
FIG. 6 is a plan view of FIG. 5.

FIG. 5 is a side view of a body frame as a strength member of the vehicle 1 as seen from the side portion of the vehicle (in the same direction as FIG. 1), and FIG. 6 is a plan view thereof. It should be noted that in FIGS. 5 and 6, an engine 32, an air cleaner 33, a fuel tank 53, and the like that will be described later are schematically indicated by two-dot chain lines.

A body frame 80 mainly includes the two longitudinally extending lower frames 4 at the bottom portion of the vehicle, the front frames 5 fixed to the lower frames 4 and constituting the front portion of the vehicle, the upper frames 6 located above the lower frames 4 so as to extend along the lower frames 4, and side frames 81 assembled by forming a plurality of frame members in a substantially lattice-like configuration on both side portions of the lower frames 4 and upper frames 6. The lower frames 4 and the upper frames 6 are integrally connected with each other by means of vertically extending frame members (such as the brackets 29).

Figure 7:
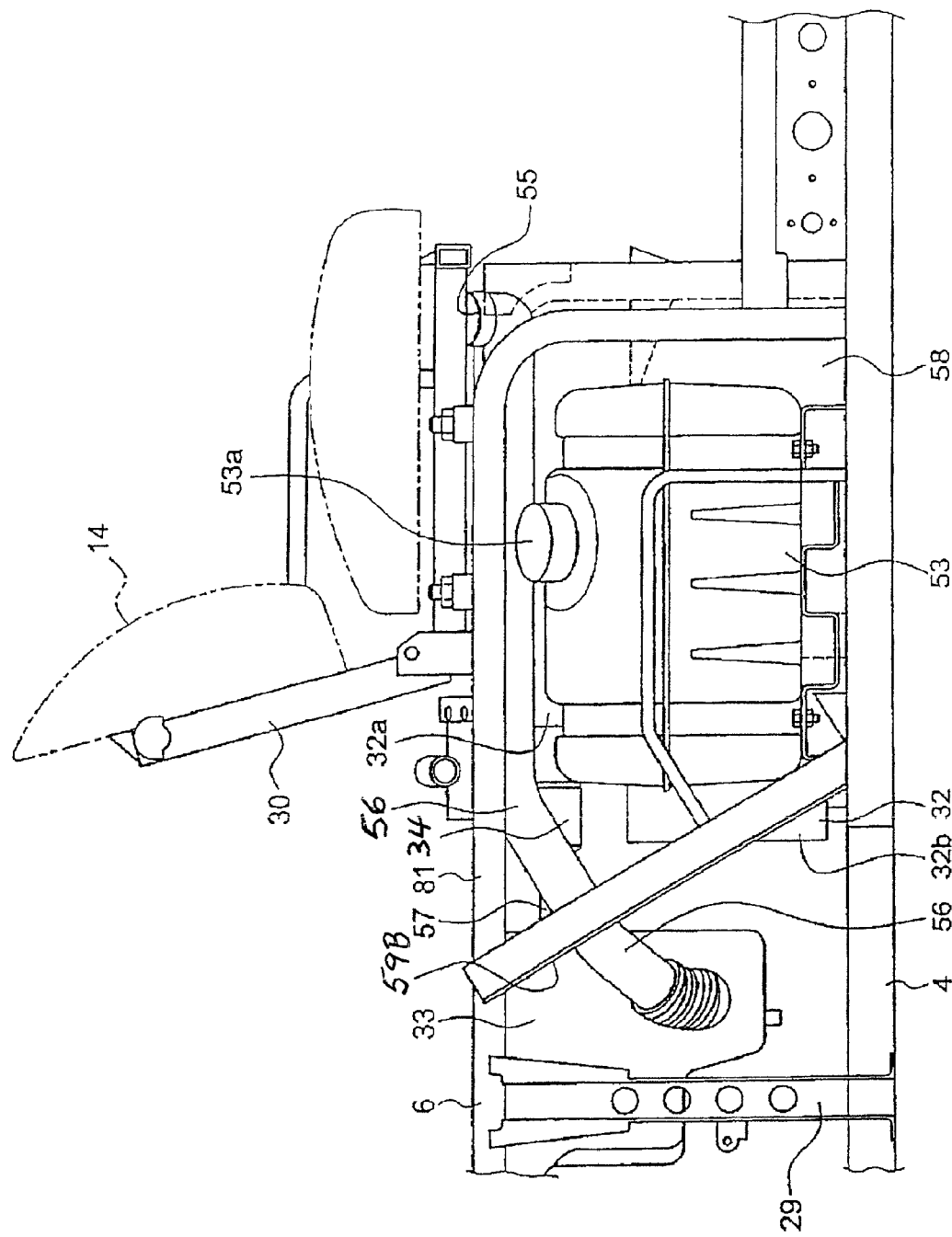
FIG. 7 is an enlarged side view showing a fuel tank and the like arranged below an occupant seat.
Figure 8:
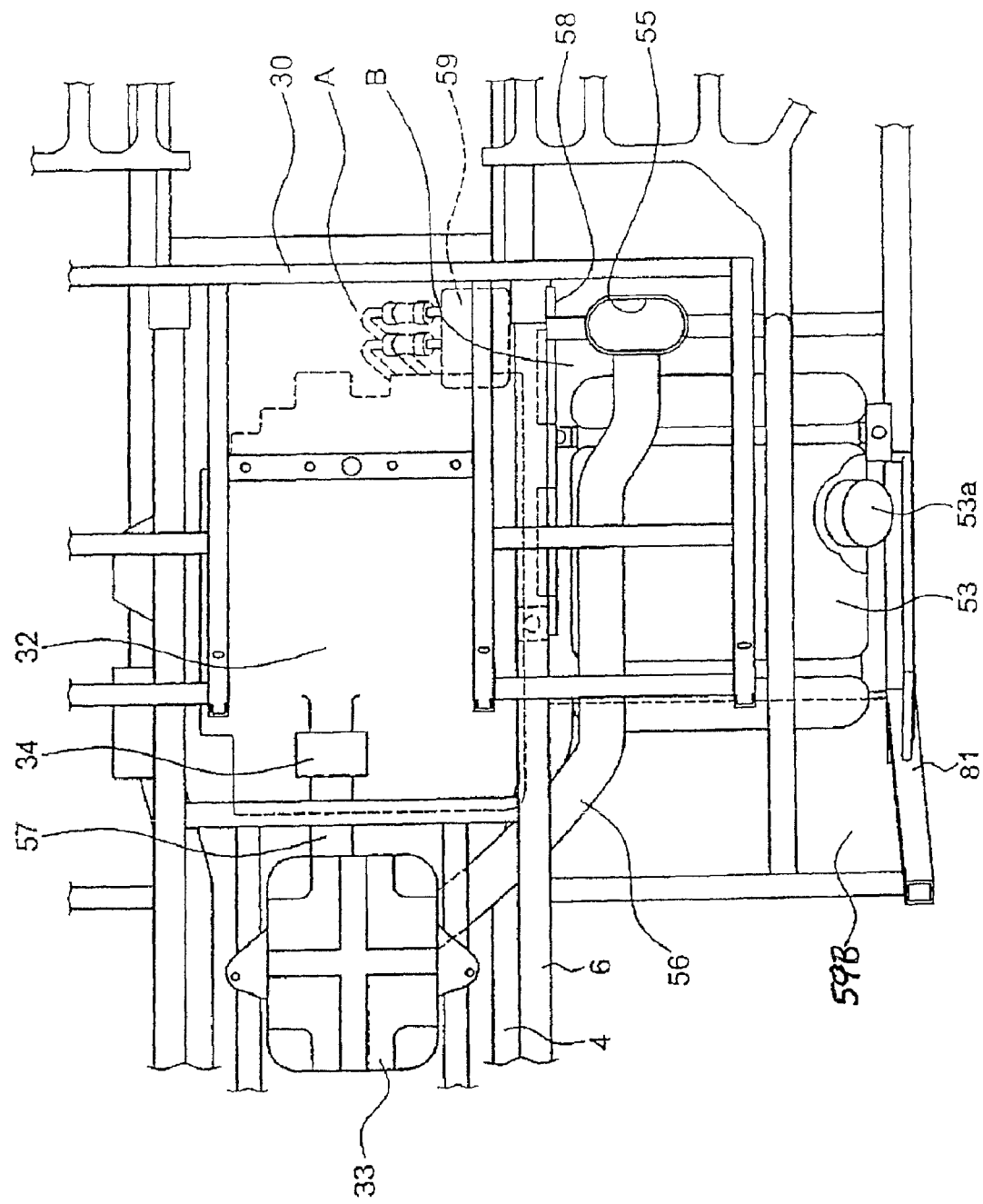
FIG. 8 is a top view of FIG. 7.

FIG. 7 is an enlarged side view of the fuel tank 53 and the like arranged below the occupant seat 14, and FIG. 8 is a plan view of FIG. 7. It should be noted that in FIG. 7, the front-rear direction as shown in FIG. 5 is reversed.

A seat frame 30 is mounted above the upper frames 6 and the side frames 81. The occupant seat 14 on each of the driver's seat and passenger seat sides is mounted on the seat frame 30. The engine 32, the fuel tank 53, and the air cleaner 33 are disposed below the occupant seat 14 and below the seat frame 30.

As shown in FIG. 8, the engine 32 is arranged below the intermediate position between the driver's seat and the passenger seat with respect to the width direction of the vehicle. Returning to FIG. 5, the engine 32 mainly includes a cylinder head 32a and a crankcase 32b located below the cylinder head 32a, with the air cleaner 33 being disposed to the rear of the engine 32. The air cleaner 33 is connected to the rear side of the cylinder head 32a via a throttle body 34 (which may be a carburetor as well). Further, an exhaust pipe 35 is connected to the front side of the cylinder head 32a. The exhaust pipe 35 is drawn forward from the cylinder head 32a and then further routed downwardly toward the crankcase 32b side before extending diagonally upwardly toward the rear of the vehicle. A muffler 36, disposed in the rear of the vehicle, is connected to the exhaust pipe 35. Further, a crankshaft is arranged inside the crankcase 32b so as to extend in the longitudinal direction of the vehicle. Driving force is transmitted to the front wheels 2 by means of a drive shaft (not shown) extending forward from the crankcase 32b. Driving force is also transmitted to the rear wheels 3 by means of a drive shaft (not shown) extending rearwardly from the crankcase 32b. Further, the engine 32 is connected via a piping (not shown) to the radiator 37 (see FIG. 1) provided on the front side of the vehicle.

Further, on the right side of an upper front portion of the engine 32, there is provided a water cooling type oil cooler 59 for cooling the engine oil circulating inside the crankcase 32b.

As shown in FIGS. 6 and 8, the fuel tank 53 is arranged below the passenger seat (the seat on the right side of the vehicle 1) and on the right side of the engine 32. The fuel tank 53 is secured with a belt made of resin onto a cover provided at the bottom portion of the body frame 80. Provided on the upper side of the fuel tank 53 is a fuel supply port 53a that opens diagonally upwardly to the outer side in the width direction of the vehicle. The fuel in the fuel tank 53 is supplied to the throttle body 34 by means of a fuel pump (not shown).

The air cleaner 33 is arranged to the rear of the engine 32. An intake port 55 for taking the air into the air cleaner 33 is provided below the front side of the passenger seat, and is arranged so that the opening of the intake port 55 is directed upward between the passenger seat and the upper surface of the fuel tank 53. The intake port 55 is coupled via an intake pipe 56 to an air inlet port located on the side portion of the air cleaner 33. The intake pipe 56 is arranged to pass through the space above the fuel tank 53 so as to avoid interference with the engine 32. Further, a duct 57 connected to the throttle body 34 is provided so as to extend from an air outlet port 33P located on the front portion of the air cleaner 33.

Due to the structure as described above, dust is removed in the air cleaner 33 from the air taken in from the intake port 55 via the intake pipe 56 and the air discharged from the air cleaner 33 is sent to the engine 32 via the duct 57. Then, the gas exhausted from the engine 32 after combustion passes through the exhaust pipe 35 to be exhausted through the muffler 36.

Figure 9:
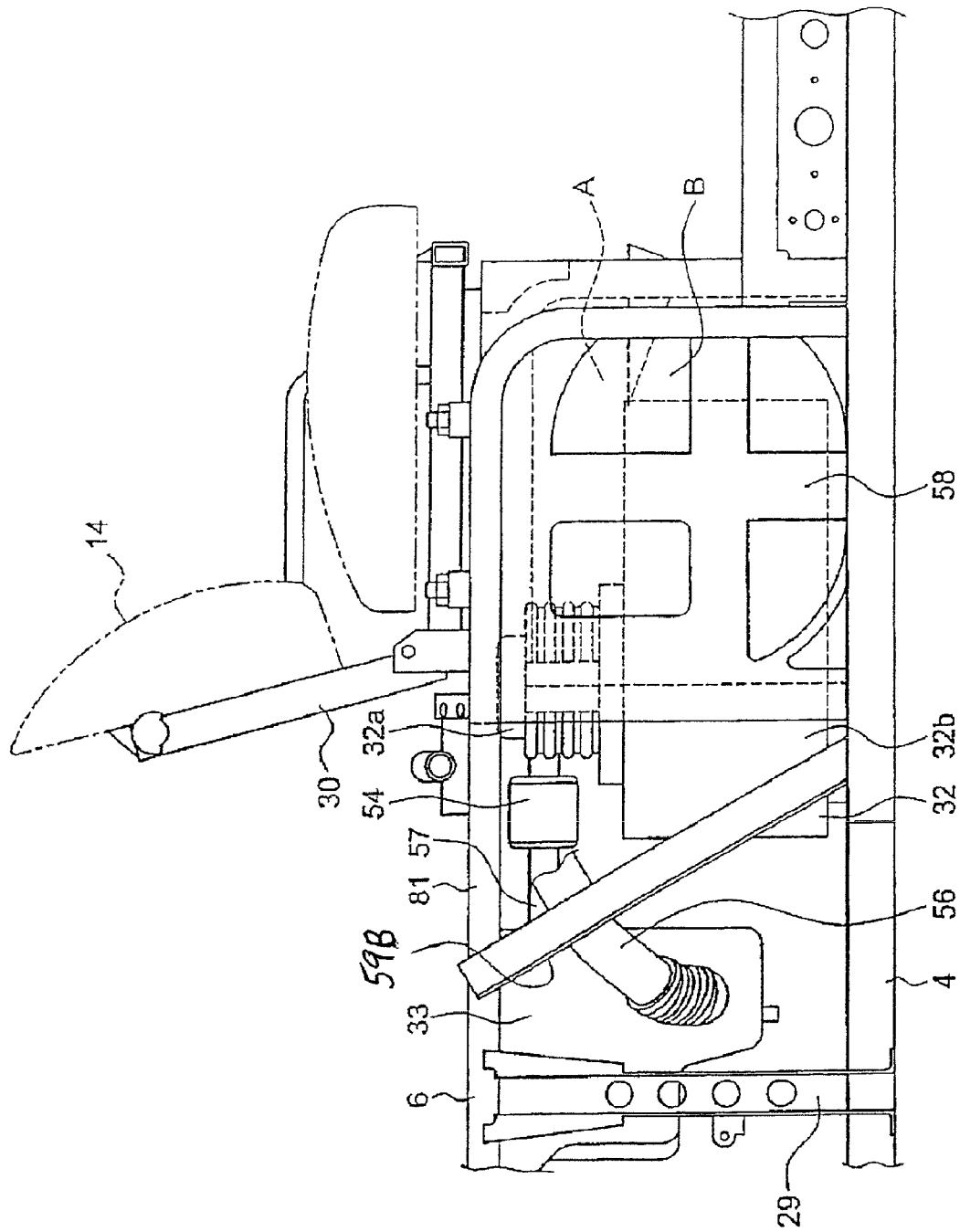
FIG. 9 is an enlarged side view showing a state with the fuel tank shown in FIG. 7 removed.

FIG. 9 shows a state with the fuel tank 53 removed from the state shown in FIG. 7.

A vertically extending partition wall 58 is provided between the engine 32 and the fuel tank 53. The partition wall 58 is attached onto the body frame 80, and separates between a space A on the engine 32 side and a space B on the fuel tank 53 side in the lateral direction of the vehicle. This serves to prevent the convection of the heat of the engine 32 from the space A to the space B.

Further, a back cover 59B is provided to the rear of the fuel tank 53. The back cover 59B is also attached onto the vehicle frame 80 and is provided so as to slope from the rear of the body toward the lower front side thereof in conformity with the slope of the body frame 80.

With the intake structure for a seat type vehicle according to the embodiment of the present invention, by providing the intake port 55 above the fuel tank 53, the air intake path can be shortened, and the intake efficiency can be enhanced in comparison to the structure of the related art. Further, since the air that is taken in is not heated with the heat of the engine 32, the thermal efficiency of the engine 32 can be enhanced. Further, the arrangement of the intake pipe 56 above the fuel tank 53 prevents the air passing through the intake pipe from being heated with the heat of the engine 32, thereby making it possible to enhance the thermal efficiency of the engine 32. Furthermore, the provision of the partition wall 58 makes it possible to prevent the taken-in air from being heated due to the convection of heat flowing from the engine 32 side.

On the other hand, since the intake port 55 is arranged between the occupant seat 14 and the fuel tank 53 so as to open upwardly, the intake port 55 is positioned above a submergence line (the line drawn at the lowest position from among the intake port 55, the opening of the muffler 36, and the throttle body 34), thereby making it possible to prevent the intrusion of water from the intake port 55.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An intake structure for a seat type vehicle having an engine and a fuel tank mounted side by side in a lateral direction of the vehicle under an occupant seat and attached onto a frame comprising:
   an air cleaner arranged in a rearward direction of the engine; and
   an intake port for the air cleaner being provided under the occupant seat and above and forward with respect to the fuel tank and the engine.

2. The intake structure for a seat type vehicle according to claim 1, further comprising an intake pipe connecting between the intake port and the air cleaner, the intake pipe extending rearwardly from the intake port along an entire upper surface of the fuel tank so as to avoid interference with the engine.

3. The intake structure for a seat type vehicle according to claim 2, wherein a partition wall is provided between the engine and the fuel tank.

4. The intake structure for a seat type vehicle according to claim 3, and further including a back cover operatively positioned rearwardly relative to said fuel tank.

5. The intake structure for a seat type vehicle according to claim 1, wherein a partition wall extending in a front-to-back direction of the vehicle is provided between the engine and the fuel tank.

6. The intake structure for a seat type vehicle according to claim 5, since the intake pipe extending rearwardly above the fuel tank and the engine are on opposite sides of the partition wall, the partition wall prevents air entering into the intake port from being heated by convection of heat flowing from the engine.

7. The intake structure for a seat type vehicle according to claim 5, and further including a back cover operatively positioned rearwardly relative to said fuel tank.

8. The intake structure for a seat type vehicle according to claim 1, wherein the intake port for the air cleaner is directed upwardly between the occupant seat and an upper surface of the fuel tank.

9. The intake structure for a seat type vehicle according to claim 8, wherein positioning the intake port to open upwardly between the occupant seat and an upper surface of the fuel tank prevents air entering into the intake port from being heated by the engine.

10. The intake structure for a seat type vehicle according to claim 1, an further including a substantially straight duct operatively connected between an air outlet port for said air cleaner and a throttle body for the engine.

11. An intake structure adapted to be used with a seat type vehicle having an engine and a fuel tank mounted side by side in a lateral direction of the vehicle comprising:
   an air cleaner for cleaning air supplied to the engine, said air cleaner being arranged in a rearward direction of the engine; and
   an intake port for supplying air to the air cleaner, said intake port being provided under the occupant seat and above and forward with respect to the fuel tank,
   wherein the air cleaner is located midway between right and left frames extending in a longitudinal direction of the vehicle, and intake port is located on either an outer side of either the right frame, or on an outer side of the left frame.

12. The intake structure adapted to be used with a seat type vehicle according to claim 11, wherein a partition wall extending in a front-to-back direction of the vehicle is provided between the engine and the fuel tank.

13. The intake structure adapted to be used with a seat type vehicle according to claim 12, since the intake pipe extending rearwardly above the fuel tank and the engine are on opposite sides of the partition wall, the partition wall prevents air entering into the intake port from being heated by convection of heat flowing from the engine.

14. The intake structure adapted to be used with a seat type vehicle according to claim 12, and further including a back cover operatively positioned rearwardly relative to said fuel tank.

15. The intake structure adapted to be used with a seat type vehicle according to claim 11, wherein the intake port for the air cleaner is directed upwardly between the occupant seat and an upper surface of the fuel tank.

16. The intake structure adapted to be used with a seat type vehicle according to claim 15, wherein positioning the intake port to open upwardly between the occupant seat and an upper surface of the fuel tank prevents air entering into the intake port from being heated by the engine.

17. The intake structure adapted to be used with a seat type vehicle according to claim 11, further comprising an intake pipe connecting between the intake port and the air cleaner, the intake pipe extending rearwardly from the intake port along an entire upper surface of the fuel tank so as to avoid interference with the engine.

18. The intake structure adapted to be used with a seat type vehicle according to claim 11, wherein the air-cleaner is located on a longitudinal center line of the vehicle.

19. The intake structure adapted to be used with a seat type vehicle according to claim 11, wherein the intake port and the fuel tank are located on the same one of the outer side of the right frame or the left frame.

20. The intake structure adapted to be used with a seat type vehicle according to claim 11, an further including a substantially straight duct operatively connected between an air outlet port for said air cleaner and a throttle body for the engine.

* * * * *